United States Patent [19]

Harten et al.

[11] E Re. 29,150

[45] Reissued Mar. 8, 1977

[54] CONVERGENCE COIL ASSEMBLY FOR COLOR TELEVISION

[75] Inventors: John T. Harten, Longmeadow; Frank J. Zoladz, Willimansett, both of Mass.

[73] Assignee: General Instrument Corporation, Clifton, N.J.

[22] Filed: Nov. 28, 1975

[21] Appl. No.: 636,125

Related U.S. Patent Documents

Reissue of:

[64] Patent No.: 3,496,501
Issued: Feb. 17, 1970
Appl. No.: 639,833
Filed: May 19, 1967

[52] U.S. Cl. ..... 335/212; 335/213

[51] Int. Cl.[2] ..... H01F 7/00

[58] Field of Search ..... 335/210, 212, 213

[56] References Cited

UNITED STATES PATENTS

| | | | |
|---|---|---|---|
| 2,565,331 | 8/1951 | Torsch | 335/213 |
| 2,766,393 | 10/1956 | Casey | 335/212 |
| 2,880,340 | 3/1959 | Armstrong | 335/212 |
| 2,897,390 | 7/1959 | Jensen | 335/212 |
| 3,138,730 | 6/1964 | Heuer et al. | 335/212 |
| 3,188,534 | 6/1965 | Patti | 335/212 |
| 3,201,629 | 8/1965 | Ammerman | 335/212 |
| 3,303,444 | 2/1967 | Leeb et al. | 335/212 |
| 3,349,268 | 10/1967 | Babcock et al. | 335/212 |
| 3,354,337 | 11/1967 | De Both | 335/212 |

*Primary Examiner*—George Harris

[57] ABSTRACT

The convergence coil assembly comprises a frame plate with guides at an angle of 120° to receive three coil housings which are slidable radially to compensate for variations in the diameter of the tube neck. At their inner ends the housings have flanges receiving a resilient clamp ring to draw them against the tube neck. The clamp ring may be hooked to provide different degrees of tension. Indicators provide visual alignment of the magnets with a desired part of the gun. A permanent magnet on the outer end of the core of the electromagnets is rotatable for adjustment, and there are means to hold the adjustment.

15 Claims, 8 Drawing Figures

INVENTORS
JOHN T. HARTEN
FRANK J. ZOLADZ
BY James and Franklin
ATTORNEYS

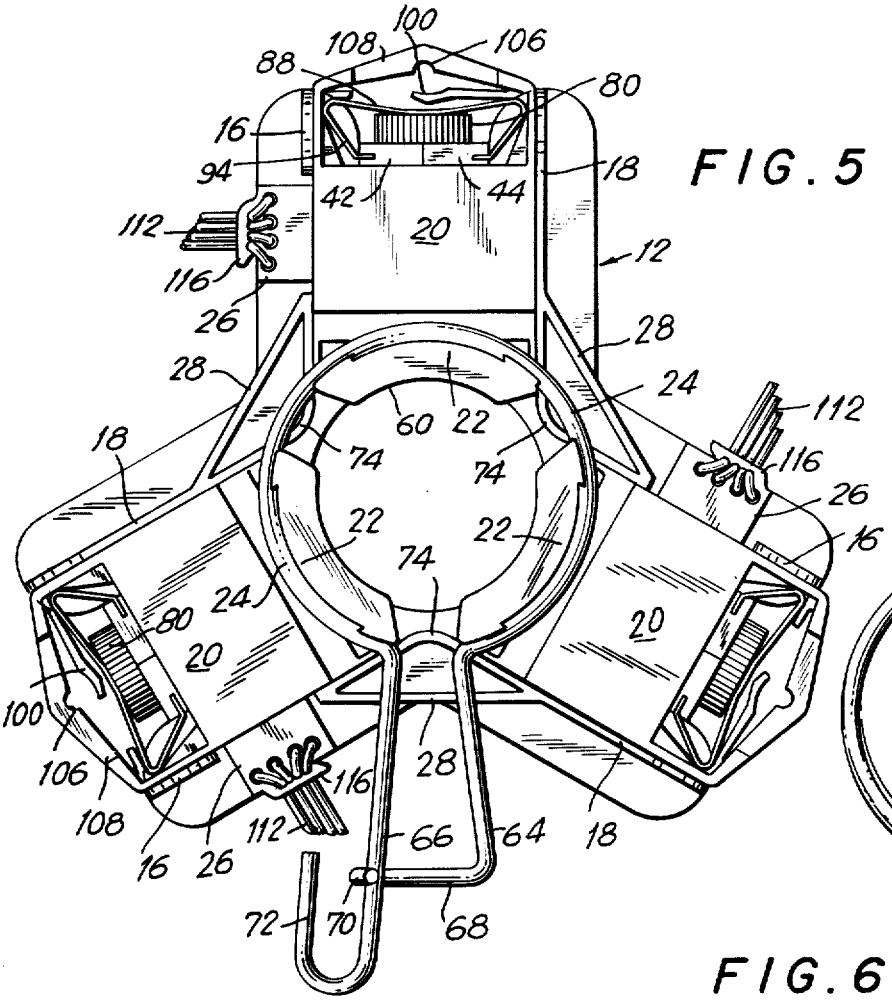
FIG. 5
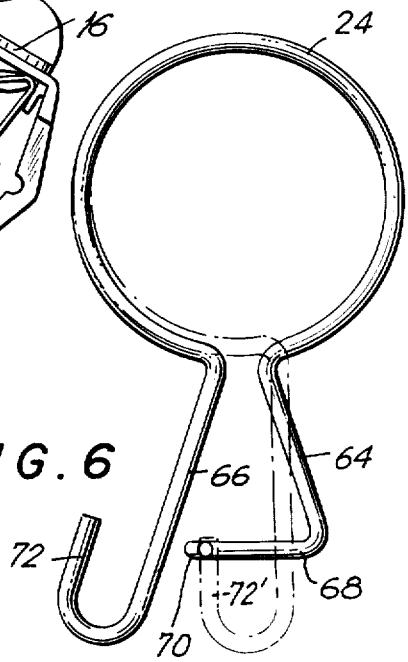
FIG. 6
FIG. 8
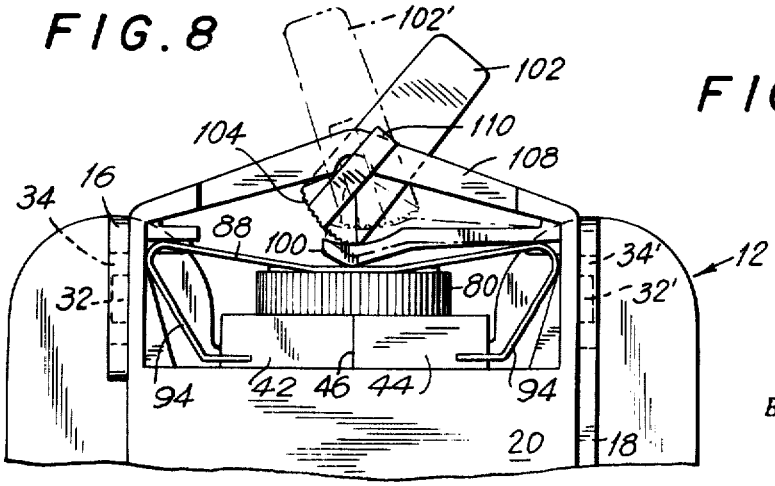
FIG. 7
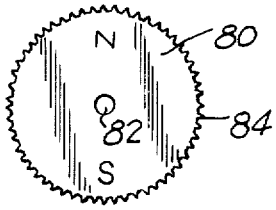
INVENTORS
JOHN T. HARTEN
FRANK J. ZOLADZ
BY James and Franklin
ATTORNEYS

CONVERGENCE COIL ASSEMBLY FOR COLOR TELEVISION

Matter enclosed in heavy brackets [ ] appears in the original patent but forms no part of this reissue specification; matter printed in italics indicates the additions made by reissue.

BACKGROUND OF THE INVENTION

The kinescope or picture tube for color television has a triple gun, and requires color convergence coils disposed behind the main deflection yoke. One problem is a variation in the diameter of the glass neck of the tube. A typical tube specification may be plus or minus 1/16 inch for the neck diameter. Another problem is to secure best axial location of the convergence coil assembly on the neck of the tube. A further problem is to provide easily accessible means for adjustment of the electromagnets, as by means of a permanent magnet which is adjustable relative to the electromagnets.

SUMMARY OF THE INVENTION

The present convergence coil assembly comprises a frame plate with a hole large enough to receive the neck of a color tube of maximum contemplated diameter, and has guides disposed at an angle of 120° to receive three coil housings, these being movable radially on the frame plate to compensate for tube necks of smaller diameter. At their inner ends the housings have flanges receiving a resilient wire clamp ring which draws the housings toward one another and against the tube neck. This ring has outwardly directed end parts which may be hooked together to place the ring under tension. Either of two degrees of tension may be provided, thus additionally compensating for a difference in diameter of the tube neck.

The frame plate has indicators which are located and are visible between the coil housings to indicate the center line of the coils in the housings. This facilitates visual alignment of the coil assembly with a desired part of the gun as seen through the transparent glass of the neck.

A permanent magnet rests against the exposed outer end of the core of the electromagnets. The coil housing and the frame plate are open in order to expose parts of the periphery of the permanent magnet to facilitate rotational adjustment of the same. The permanent magnet is retained in position by a leaf spring mount the middle part of which centers the permanent magnet and also acts as a friction brake bearing against the magnet to retain its adjustment. In addition, an oscillatable locking lever with a locking cam also may be used to lock the adjustment of the permanent magnet. The side of the coil housing is preferably molded with effective strain relief means for the external leads connected to the coils.

The foregoing and additional features are described in the following detailed specification, which is accompanied by drawings in which:

FIG. 5 is an elevation showing the side of the assembly opposite that shown in FIG. 1;

FIG. 6 is explanatory of the construction of the clamp ring;

FIG. 7 shows the circular permanent magnet; and

FIG. 8 is a fragmentary view like the upper end of FIG. 5 but drawn to larger scale and showing the use of a cam lock as an optional addition to the coil housings.

Figure 1:
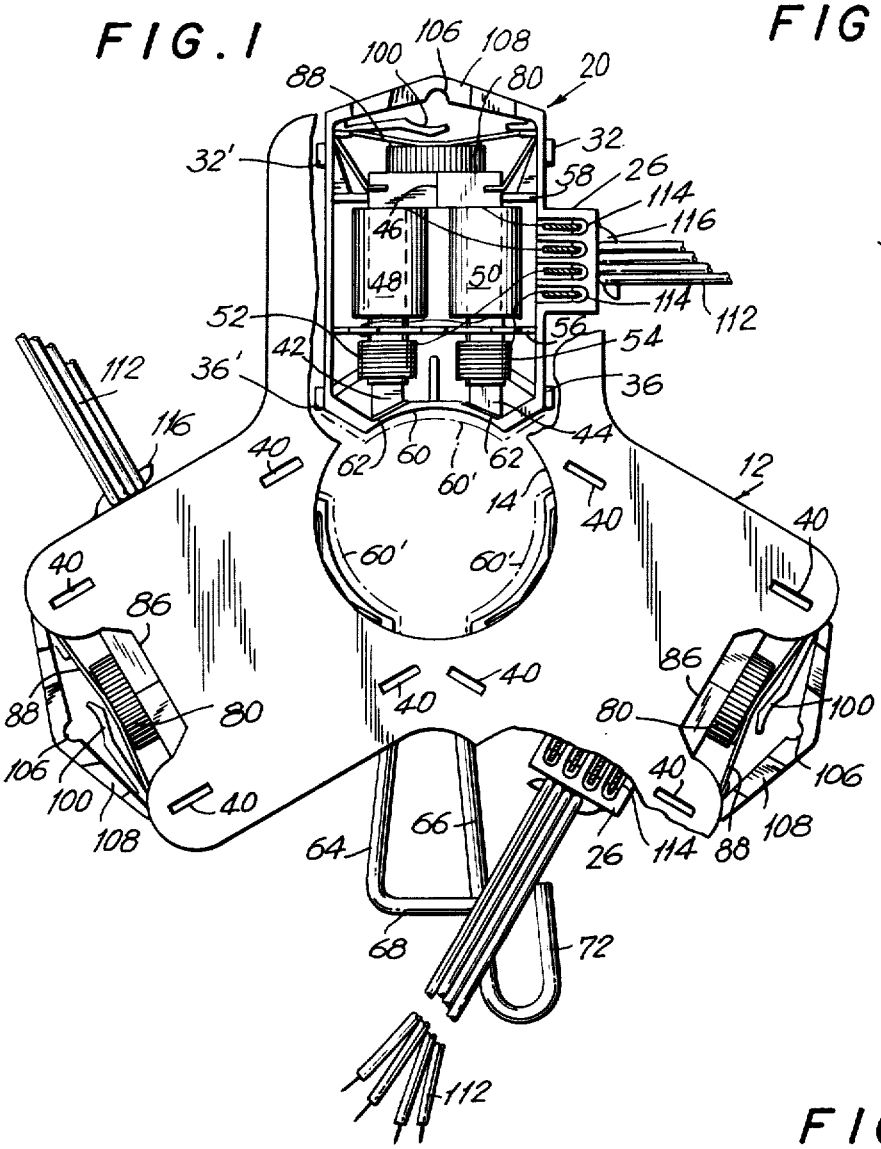
FIG. 1 shows the assembly looking toward the frame plate, with the plate cut away to expose the open side of one of the coil housings.

Referring to the drawing, there is a frame plate 12 (FIG. 1) with a hole 14 large enough to receive the neck of a color tube of maximum contemplated diameter. The frame plate has guides or rails 16 and 18 (FIG. 5) disposed at an angle of 120° to receive three coil housings 20. These are movable radially to compensate for tube necks of smaller diameter. At their inner ends the housings have arcuate flanges 22 receiving a clamp 24 which draws the housings toward one another and against the tube neck. The parts 16 and 18 act as guides molded integrally with and projecting from the flat surface of the frame plate 12. The guides 18 are continuous, whereas the guides 16 are interrupted, this being done to make room for a strain relief member 26 which is molded integrally at the side of the housing 20. The parts may be additionally strengthened and reinforced by diagonal webs 28 which extend between the rail 18 of one arm and the rail 16 of the adjacent arm.

The housings 20 each include a boxlike member one face of which is open for insertion of the coils. When the housing is applied to the frame plate 12 the open face of the housing is covered and closed by the frame plate. The open side of the housing is best shown at the top of FIG. 1, where the frame plate has been cut away to expose the housing.

Figure 2:
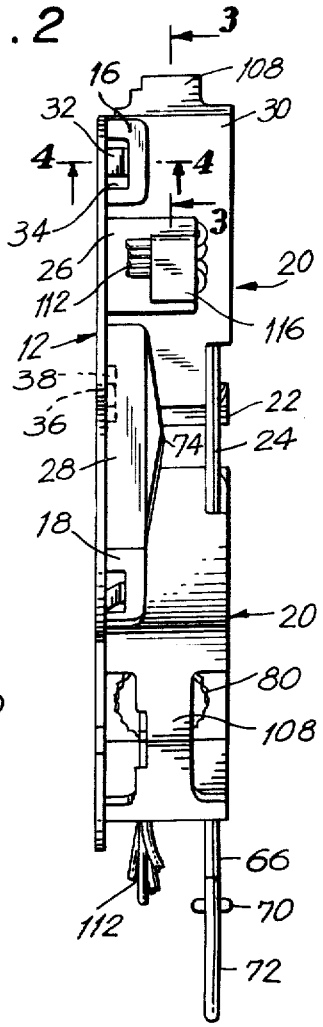
FIG. 2 is an elevation looking toward the right edge of FIG. 1.
Figure 3:
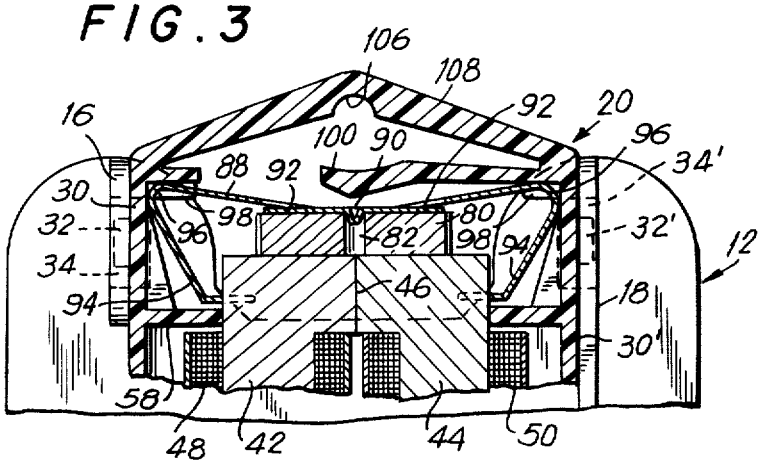
FIG. 3 is a fragmentary section drawn to enlarged scale and taken approximately on the line 3—3 of FIG. 2.
Figure 4:
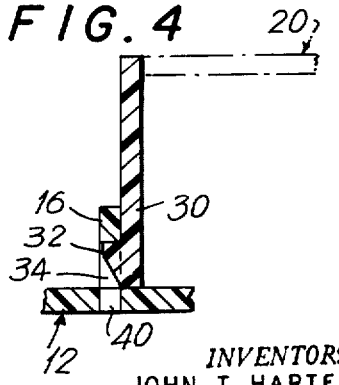
FIG. 4 is a fragmentary section taken approximately on the line 4—4 of FIG. 2.

Referring now to FIGS. 2 and 4, the side wall 30 of the housing has a detent 32 near its outer end. This is received in a slot 34 in the guide rail 16. As seen in FIGS. 2 and 3, the slot 34 is substantially longer than the detent 32, thus affording the desired radial sliding movement. There is a similar detent 32' (FIG. 3) on side wall 30' movable in a similar slot 34' in the opposite guide rail 18. Moreover, the inner ends of side walls 30 and 30' have similar detents 36 and 36' (FIG. 1) slidable in similar slots 38 (FIG. 2) and 38'. Slot 38' (not shown) is like slot 38 shown in FIG. 2, but is on wall 30' instead of wall 30.

In FIG. 1 reference may be made to the slots 40 passing through the frame plate 12. There are twelve such slots, four for each of the 120° arms of the frame plate. Referring to FIG. 4, it will be seen that slot 40 is aligned with the guide rail 16 and facilitates formation of the desired slot 34 during the molding operation without requiring the use of movable cores. Instead, fixed cores passing through frame plate 12 serve to form the desired slots 34, 34', 38 and 38'. In this case the slots are about ⅛ inch longer than the detents received thereby and so provide a radial movement of ⅛ inch.

FIG. 4 shows the sloping shape of the detents, which makes it possible to readily apply the housing to the frame plate by simply pushing it into position. The molding material used is preferably polypropylene, which is somewhat yieldable. A housing may be disassembled from the frame plate by outwardly bending the guides 16 and 18 to release the detents.

Referring now to FIG. 1, the housing contains two L-shaped cores 42 and 44 the outer ends of which are abutted as shown at 46 to provide a U-shaped core. This construction is shown in section in FIG. 3. Coils 48 and 50 are applied to the cores 42 and 44, and smaller coils 52 and 54 (FIG. 1) are received over the lower ends of the cores 42 and 44. An insulation spacer 56 may be applied to the core between the larger and smaller coils to hold the coil assembly in position in the box. It also has lugs at which the ends of the coil wire are supported and soldered together.

The outer end of the resulting U-shaped core is received in and passes through a mating opening or recess in a partition wall 58 which is molded integrally with the housing. The lower end of the housing has a curved shape indicated at 60 and dimensioned to conform to a tube neck of medium diameter. The inward movement of the housing is indicated in broken lines at 60' in FIG. 1. The inner ends of the cores 42 and 44 are bevelled to conform to the curvature of the arcuate wall 60 and the tube neck. Thin plates of core material may be used beneath the inner ends of the cores as indicated at 62 to enlarge (axially of the tube neck) the effective area of the inner ends of the magnet poles. The housing as molded receives and locates the plates 62.

It has already been mentioned that the housings are drawn inward by a suitable resilient wire clamp ring 24 shown in FIGS. 2, 5 and 6. Referring to FIG. 6 the end parts of the clamp ring project outwardly at 64 and 66. The first end part 64 is additionally bent at 68 toward the second part 66, and is provided with a small hook 70 at its tip, which may be used to engage the part 66 as is best shown in FIG. 5. This puts the ring under tension, and may be used when the picture tube neck is of large diameter. The second part 66 is additionally reversely bent to provide a third part 72 which is spaced from the second part 66 and which extends inward far enough to receive the hook 70 as shown in broken lines at 72' in FIG. 6. This provides a different degree of clamp tension, and may be used when the picture tube neck is of small diameter.

Referring to FIG. 5 the adjacent guide rails 16 and 18 are joined at an apex 74, there being three such apices 120° apart. Referring next to FIG. 2, the normal guide rail height is indicated at 16, 18 and 28. However, the adjoining parts of the guide rails 16 and 18 slope to greater height at their juncture or apex 74. The increased height at the apex 74 is made to coincide with the plane of the center lines of the coils in the housing. This is done so that the apex may be used as an indicator which is visible in the space between the inner ends of the coil housings, and which may be visually aligned with a desired part of the triple gun in the neck of the picture tube as seen through the transparent glass of the neck. These indicators greatly facilitate proper axial location of the convergence coil assembly on the neck of the tube.

For independent adjustment of the convergence magnets relative to one another, each has a movable permanent magnet. Referring to FIG. 7, the permanent magnet 80 is made circular for convenient adjustment by rotation about its center hole 82. It is polarized diametrically, as indicateed by the letters "N" and "S". To facilitate manual adjustment the periphery may be knurled or serrated as indicated at 84. The top and bottom faces of the magnet are flat.

Referring now to the FIGS. 1 and 3, the magnet 80 resets directly on the outer end of the core 42, 44 of the electromagnet assembly. The outer end part of the coil housing 20, outside partition 58, is open on both faces for easy access to diametrically opposed parts of the magnet 80, and the frame plate 12 is also cut away or recessed inward as is best shown at 86 in FIG. 1, in order to facilitate manual rotational adjustment of the three pemanent magnets 80.

Referring now to FIG. 3, the permanent magnet 80 may be retained in position by means of a leaf spring mount 88 the middle part of which has a centering teat 90 which is received in the center hole 82 of the permanent magnet in order to locate and pivot the same. The middle portion of the leaf spring 88 bears tightly against the outer face of the permanent magnet 80, and acts as a friction brake to retain adjustment of the same. To enhance this braking effect two adjacent tongues may be struck downward from the leaf spring as shown at 92, in order to increase the frictional contact, and to stabilize the relation of the parts.

In the preferred form here illustrated the ends of the leaf spring 88 are extended and are directed inward as shown at 94 (FIG. 3), and are notched to fit around the cores 42 and 44 in order to position the spring 88 which in turn positions the rotatable magnet 80. The corners 96 of the leaf spring are received in and are held by the housing, and the latter includes locating stops 98 which limit the insertion of the spring as it is being pushed into the housing.

If desired, an additional lock means may be provided to more positively lock the rotational adjustment of the permanent magnet 80. One part of such a lock, the lock shoe 100, is molded integrally with the housing 20, whether or not used. This brake shoe 100 is therefore shown in all figures of the drawing, but is not shown in use except in FIG. 8, in which a locking lever 102 has been added. This lever has a locking cam 104 and a fulcrum molded integrally with the lever. The rounded fulcrum at the top of cam 104 is received in a fulcrum groove 106 (FIGS. 1, 3 and 5), this groove being molded in the outer end wall 108 of the housing. In FIG. 8 the released position of the locking level is shown in broken lines at 102'. When it is turned to the solid line position 102 the cam 104 bears tightly against the locking shoe 100 and wedges it toward and tightly against the leaf spring 88 and the permanent magnet 80, thereby securely locking the rotational adjustment of the permanent magnet, without moving or disturbing its adjustment. This is an important advantage of using the shoe 100. The cam moves past dead center and is self retaining in locked position. As shown in FIG. 8, the locking lever 102 is at the far side of the end wall 108. An anchor lug 110 is provided on the cam at the inner side of the end wall 108 to hold the lock against escape. The wall 108 is narrower than the housing, as will be seen in FIG. 2.

FIGS. 1 and 5 show a flat four wire cable 112 leading to the coils of each housing. FIG. 1 also shows how the fine wire of the small coils 52 and 54 is led to two of the external leads, while the fine coil wire of the larger coils 48 and 50 lead to the other two wires of the cable. Strain relief means are provided, and for this purpose one side wall of the housing is molded with the strain relief block 26 previously mentioned. As viewed in FIG. 5 there are four holes passing downwardly through each block 26, and these holes open at their inner ends into slots 114 (FIG. 1) extending toward the inside of the housing. The bared ends of the leads are soldered to the fine coil wires, and this is readily done while the ends project downwardly by dipping or pot soldering, subsequent to which the soldered connections may be bent at right angles so as to be received in the slots 114.

This alone would provide some strain relief, but in addition the outer face of each block 26 has a strain relief arm 116 molded integrally therewith. This arm holds the lead wires in rather sharply reversely bent condition, and thereby additionally anchors the same firmly against external stress to protect the delicate coil wire. In the form here shown each arm is connected at one end and is open at the other end, and tends to move resiliently toward the block 26.

It is believed that the method of constructing and using our improved convergence coil assembly for color television kinescopes, as well as the advantages thereof, will be apparent from the foregoing detailed description. It will also be apparent that while we have shown and described our improvement in a preferred form, changes may be made without departing from the scope of the invention, as sought to be defined in the following claims.

We claim:

1. A convergence coil assembly for color television comprising a frame plate [having] *with* a hole large enough to receive the neck of a color tube of maximum contemplated diameter [,] and having a plurality of [substantially equally spaced] guide means fixed thereon and [spaced circumferentially] *substantially equally circumferentially spaced* about said hole, *and extending generally radially with respect to said hole,* and a plurality of housings operatively connected to [the] *said* guide means *respectively* and movable within said guide means toward and away from said hole, magnet means operatively connected to said [housing, and means acting on said housing to urge them radially inward toward said hole to adjust the positions of said housing for tube necks of different diameters, said guide means being fixed during the movement of said housings thereby to maintain the relative spaced positions about said hole of said housings and magnet means during said movement.] *housings, flanges on said housings adjacent the inner ends thereof, and a clamp ring engaging said flanges and active to urge them and their respective housings towards one another and against the tube.*

2. A convergence coil assembly as defined in claim 1, in which there is a clamp ring to draw the housings toward one another and against the tube neck, and ] in which [the] *said* clamp ring is made of relatively stiff resilient wire, and in which the end parts of the clamp ring project outwardly, the first of said end parts being additionally bent toward the second of said end parts and being provided with a hook at its tip to engage the second part in order to put the ring under tension.

3. A convergence coil assembly as defined in claim 2, in which the second outwardly bent part of the clamp ring is additionally reversely bent to provide a third part spaced from the second part and dimensioned to receive the aforesaid hook of the first part, but with a different degree of clamp tension than when the hook engages the second part.

4. A convergence coil assembly as defined in claim 3, in which the frame plate has indicators thereon which are located and visible between the [coil] housings near the tube neck and which serve to indicate the center line of the magnets in the housings, said indicators facilitating visual alignment of the magnets *operatively connected to* with a desired part of the gun in the neck of the tube as seen through the transparent glass of the neck.

5. A convergence coil assembly as defined in claim 4, *in which said magnet means is electromagnetic and comprises a core and a coil, and* in which there is a permanent magnet resting against the outer end of the core of the electromagnets in each housing, said permanent magnet being rotatable for adjustment purposes, and [ coil ] housing and said frame plate being open at opposed parts of said permanent magnet to facilitate manual rotational adjustment of the same.

6. A convergence coil assembly as defined in claim 5, in which the rotatable permanent magnet has a center hole and is retained by means of a leaf spring mount, the middle part of which has a centering teat received in the center hole in the permanent magnet to locate and pivot the same, the middle part of said leaf spring bearing tightly against said permanent magnet and acting as a friction brake to help retain the adjustment of the same.

7. A convergence coil assembly as defined in claim 6, in which the [ coil ] housing has a lock shoe extending over the center portion of the leaf spring, and has an oscillatable locking lever carrying a locking cam at its inner end, said cam bearing against said locking shoe to wedge the same tightly against the leaf spring and the permanent magnet in order to lock the rotational adjustment of said permanent magnet.

8. A convergence coil assembly as defined in claim 7, in which the coils have fine wire connected to external leads of heavier wire, and in which the side of the [ coil ] housing as molded has strain relief means, with a plurality of holes for said leads, said holes opening at one end into slots transverse to the holes for receiving soldered connections between the fine magnet wire and the heavier lead wire, and said strain relief means including an arm outside the other ends of the holes for reversely bending the lead wires and thereby additionally anchoring them against external stress.

9. A convergence coil assembly as defined in claim 1, in which the frame plate has indicators thereon which are located and visible between the [ coil ] housings near the tube neck and which serve to indicate the center line of the magnets in the housings, said indicators facilitating visual alignment of the magnets with a desired part of the gun in the neck of the tube as seen through the transparent glass of the neck.

10. A convergence coil assembly as defined in claim 1, *in which said magnet means is electromagnetic and comprises a core and a coil, and* in which there is a permanent magnet resting against the outer end of the core of the electromagnets in each housing, said permanent magnet being rotatable for adjustment purposes, said [ coil ] housing being open at a part of said permanent magnet to facilitate manual adjustment of the same.

11. A convergence coil assembly as defined in claim 10, in which the rotatable permanent magnet has a center hole and is retained by means of a leaf spring mount, the middle part of which has a centering teat received in the center hole in the permanent magnet to locate and pivot the same, the middle part of said leaf spring bearing tightly against said permanent magnet and acting as a friction brake to help retain the adjustment of the same.

12. A convergence coil assembly as defined in claim 10, in which the rotatable permanent magnet has a center hole and is retained by means of a leaf spring mount, the ends of which are reversely bent and directed inwardly and being notched to fit around the core of the electromagnets, and the middle part of which has a centering teat received in the center hole in the permanent magnet to locate and pivot the same, the said middle part of said leaf spring bearing tightly against said permanent magnet and acting as a friction brake to help retain the adjustment of the same.

13. A convergence coil assembly as defined in claim 10, in which the [coil] housing has a lock shoe extending over the permanent magnet, and has an oscillatable locking lever carrying a locking cam at its inner end, said cam bearing against said locking shoe to wedge the same tightly toward the permanent magnet in order to lock the rotatinal adjustment of said permanent magnet.

14. A convergence coil assembly as defined in claim 11, in which the [coil] housing has a lock shoe extending over the permanent magnet, and has an oscillatable locking lever carrying a locking cam at its inner end, said cam bearing against said locking shoe to wedge the same tightly toward the permanent magnet in order to lock the rotational adjustment of said permanent magnet.

15. A convergence coil assembly as defined in claim 1, *in which said magnet means is electromagnetic and comprises a core and* in which the coils have fine wire connected to external leads of heavier wire and in which the side of the housing as molded has strain relief means, with a plurality of holes for said leads, said holes opening at one end into slots transverse to the holes for receiving soldered connections between the fine magnet wire and the heavier lead wire, and said strain relief means including one arm outside the other ends of the holes for reversely bending the lead wires and thereby additionally anchoring them against external stress.

* * * * *